March 22, 1960   A. M. GROSSFELD   2,929,090
WIPING IMPLEMENT
Filed July 15, 1957
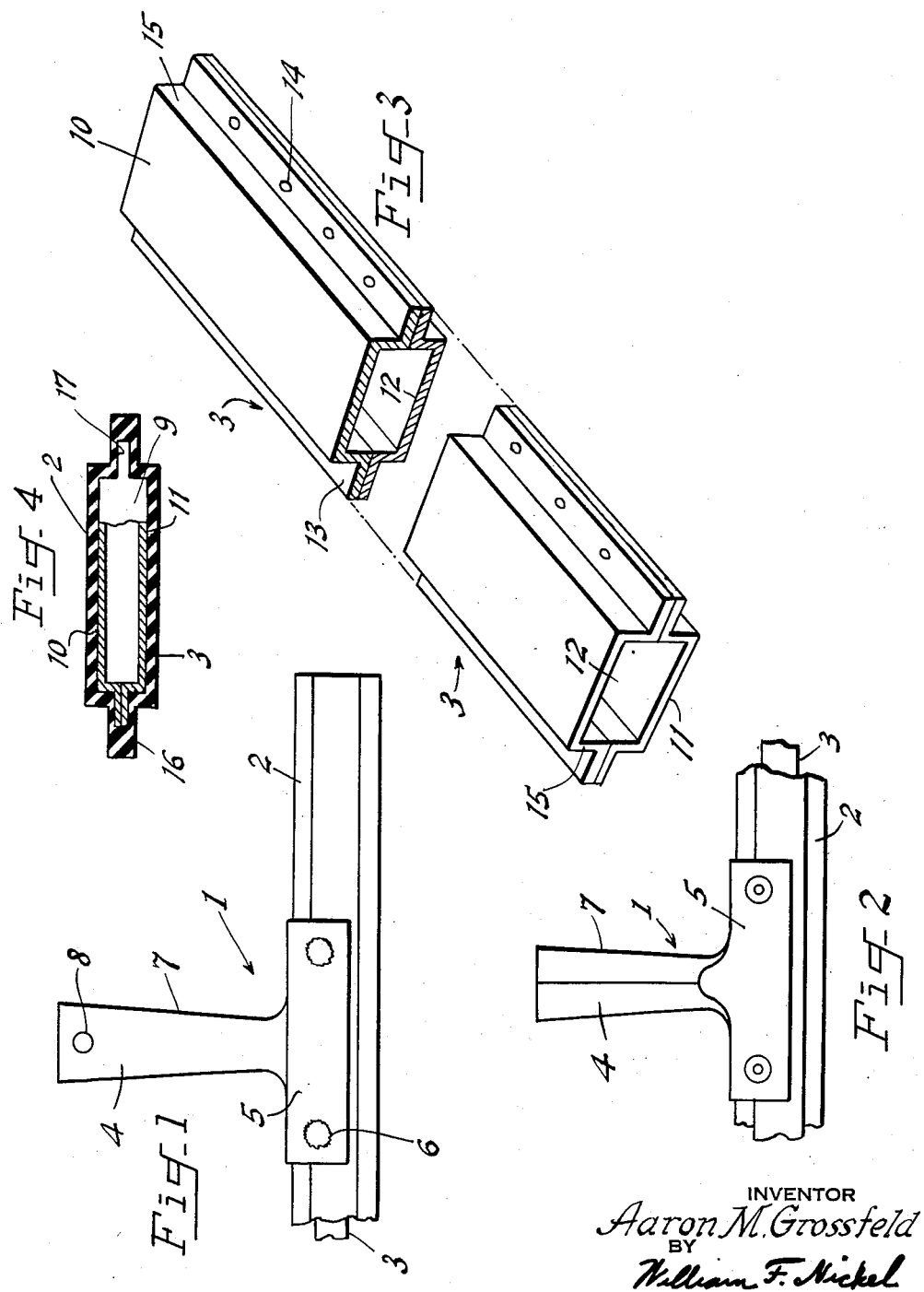
INVENTOR
Aaron M. Grossfeld
BY
William F. Nickel
ATTORNEY

United States Patent Office 2,929,090
Patented Mar. 22, 1960

2,929,090
WIPING IMPLEMENT
Aaron M. Grossfeld, New York, N.Y.
Application July 15, 1957, Serial No. 671,763
1 Claim. (Cl. 15—245)

This invention is an improved wiping implement for removing water and moisture on window panes and other surfaces after they have been washed, to enable the said surfaces to dry off more quickly.

An important object of this invention is to provide a wiping implement or "squeegee," comprising a strip of rubber or other suitable flexible material, containing a reinforcing bar or member of metal, for example, with a connector for a handle rod clamped to the strip; which has a bore extending longitudinally through it from end to end for the insertion of the reinforcing bar; the strip having such construction that it will always be perfectly straight so as to enable the wiping strip to be employed to the best advantage.

Another object is to provide an implement of the kind mentioned having a wiping strip with a bore therethrough containing a reinforcing member, the cross section of the bore and said member being such that distortion of the wiping element can never occur.

A further embodiment of the invention is fully disclosed herein and illustrated in the accompanying drawings. But this description is by way of example only. Variations in many respects may be adopted without alteration or deviation from the characteristic by which the invention is distinguished.

On the drawings:
Figure 1 is a front view of the implement.
Figure 2 is a rear view in part.
Figure 3 is a perspective view showing the construction of the metal reinforcing member.
Figure 4 is a cross section of the wiping strip with the reinforcing member therein.

The implement is shown fully on Figures 1 and 2 and is indicated as a whole by the numeral 1 and comprises a flexible wiping strip 2 containing the reinforcing member 3, and having a connector 4 with a cross piece 5 at one end. The connector is secured to the strip at the center thereof by means of screws 6 passing through the cross piece 5 the strip 2 and bar 3. The screws are attached by nuts which bear against the face of the strip on the opposite side of the cross piece. The handle comprises a socket 7 to receive a rod which can be attached thereto by a screw passing through a hole 8 at the end of the socket.

The wiping strip or member 2 has a bore 9 extending therethrough from end to end, this bore being rectangular in shape and open at the ends, so that the reinforcing member can be slipped into this strip. The reinforcing bar 3 is flat and of the same width as the bore 9 and of about the same depth thickness. If the reinforcing bar 3 is of solid metal, then instead of always being straight, it may present a slight curvature from end to end either when it is inserted or after some use. When such a condition exists, the wiping strip will not make effective contact with the surface which it engages. The wiping effect will be confined to the center alone, and the ends will not make contact with the surface; or if ends are in contact with the surface to be wiped the middle portion of the strip along its front edge will be separated therefrom. To eliminate this effect and obtain a reinforcing bar or member that will always be straight from end to end, I make the bar in two sections 10 and 11 as shown in Figures 3 and 4. Each section has a depression or channel 12 therein extending lengthwise from end to end and the edge portions along this channel portion are turned outward as indicated at 13. The sections are assembled with the space 12 in one presented to the space 12 in the other and with the portions 13 in contact. The reinforcing member thus is hollow with a passage therethrough from end to end, and the edge portions of one half or section are secured to the edge portions of the other half or section by spot welding as indicated at 14. A bar of this construction is always sure to be straight from end to end because the sides 15 of the channels 12 in the sections 10 and 11 are perpendicular to the other surfaces of the sections so that the two sections when finally connected are always straight; and further if there is any tendency of one section to bend or curve slightly, this bend or curvature will be eliminated by the other section, when the edge portions 13 are welded together. The wiping member has thinner portions 16 along its opposite longitudinal edges, and the cross section of the reinforcing member matches the cross section of the bore 9, which has narrow slots 17 in its narrower inside surfaces to receive the projecting edge portions 13 of the reinforcing member. The wiping strip and the metal reinforcement are united by pushing the reinforcing member 3 into the bore 9 at the end of the strip 2 and forcing it along until the ends of the bar or metal reinforcing member and the wiping strip are flush with each other. The handle rod is then attached to the connector 4 as described above.

Having described my invention what I believe to be new is:

A wiping implement comprising a flexible strip having a longitudinal bore extending therethrough, said bore being rectangular in cross-section, said strip having longitudinal external ribs extending along its opposite sides, the plane of said ribs being parallel to the width of said bore, an elongated reinforcing member having two sections, each with a central depression extending a major portion of the length thereof, the depression in one section being presented to the depression in the other and forming a longitudinal channel in the reinforcing member, each section having out-turned edge portions along the sides of said depression therein, said portions of one section being secured to said portions of the other, the reinforcing member being disposed in the bore of the strip, said portions forming longitudinal ribs on the reinforcing member, said strip having longitudinal grooves inside adjacent said ribs thereon and open to said bore, said out-turned portions being seated in said grooves.

References Cited in the file of this patent
UNITED STATES PATENTS

| | | |
|---|---|---|
| 624,144 | Wilmot | May 2, 1899 |
| 1,917,867 | Barker | July 11, 1933 |
| 2,212,373 | Litle | Aug. 20, 1940 |
| 2,230,489 | Grossfeld | Feb. 4, 1941 |
| 2,702,397 | Oishei | Feb. 22, 1955 |
| 2,728,099 | Cocco | Dec. 27, 1955 |
| 2,752,129 | Modine | June 26, 1956 |